United States Patent [19]

Crotty et al.

[11] Patent Number: 5,055,155
[45] Date of Patent: Oct. 8, 1991

[54] METHOD AND APPARATUS FOR LAMINATING FLEXIBLE MAGNETIC STRIPS ONTO FLEXIBLE PLASTIC SUBSTRATES

[75] Inventors: Wayne E. Crotty, Cincinnati; Harold J. Phelps, Milford, both of Ohio

[73] Assignee: Texstyle, Inc., Cincinnati, Ohio

[21] Appl. No.: 420,447

[22] Filed: Oct. 12, 1989

[51] Int. Cl.⁵ ............................................. B32B 31/18
[52] U.S. Cl. ..................... 156/256; 156/261; 156/263; 156/265; 156/272.2; 156/379.6; 156/379.9; 156/380.7; 156/511; 156/516; 156/517; 156/518; 156/519; 156/520; 156/522; 156/530; 156/552; 4/607; 4/608
[58] Field of Search ............... 156/256, 261, 263, 265, 156/272.2, 379.6, 379.8, 380.7, 511, 516, 517, 518, 520, 522, 552, 530, 519; 4/607, 608

[56] References Cited

U.S. PATENT DOCUMENTS

| | | | |
|---|---|---|---|
| Re. 29,451 | 10/1977 | Baerman | 335/303 |
| 2,212,326 | 8/1940 | Piken | 4/149 |
| 2,495,734 | 1/1950 | Katzmann et al. | 173/324 |
| 2,603,391 | 7/1952 | Kaufman | 156/263 |
| 2,750,321 | 6/1956 | Koppelman | 154/127 |
| 2,771,945 | 11/1956 | Wittrup | 160/124 |
| 2,864,096 | 12/1958 | Garber | 4/149 |
| 2,922,192 | 1/1960 | Morin | 156/518 |
| 2,971,874 | 2/1961 | Canno | 156/251 |
| 3,000,016 | 9/1961 | Ridge | 4/149 |
| 3,093,530 | 6/1963 | Lippman | 156/383 |
| 3,107,361 | 10/1963 | Glutting, Sr. | 4/149 |
| 3,124,725 | 3/1964 | Leguillon | 317/158 |
| 3,191,106 | 6/1965 | Baermann | 317/201 |
| 3,282,328 | 11/1966 | Mushro et al. | 160/349 |
| 3,365,684 | 1/1968 | Stemke et al. | 335/302 |
| 3,466,214 | 9/1969 | Polk et al. | 156/213 |
| 3,764,539 | 10/1973 | Cochardt et al. | 252/62.54 |
| 3,811,977 | 5/1974 | Kramer | 156/290 |
| 3,821,060 | 6/1974 | Braca et al. | 156/298 |
| 3,919,038 | 11/1975 | Davis | 156/520 |
| 3,983,277 | 9/1976 | Ackerman et al. | 428/46 |
| 4,017,349 | 4/1977 | DePriest et al. | 156/361 |
| 4,100,011 | 7/1978 | Foote | 156/286 |
| 4,268,344 | 5/1981 | Jones | 156/552 |
| 4,431,470 | 2/1984 | Schubert | 156/265 |
| 4,441,945 | 4/1984 | Moraw et al. | 156/282 |
| 4,626,311 | 12/1986 | Taylor | 156/308.2 |
| 4,673,450 | 6/1987 | Burke | 156/153 |
| 4,714,509 | 12/1987 | Gruber | 156/272.2 |
| 4,723,326 | 2/1988 | Tarlow et al. | 4/608 |
| 4,752,351 | 6/1988 | Lunt | 156/518 |

FOREIGN PATENT DOCUMENTS 3245108 6/1984 Fed. Rep. of Germany .......... 4/608

Primary Examiner—Caleb Weston
Attorney, Agent, or Firm—Pennie & Edmonds

[57] ABSTRACT

A method and apparatus for laminating flexible magnetic segments onto the plastic substrates, such as during the in-line production of shower curtains and/or curtain liners. The apparatus, which is configured for use with typical shower curtain and/or shower curtain liner producing machines, includes a substantially planar upper work surface for receiving the plastic substrate and at least one applicator unit located adjacent the work surface which automatically laminates a flexible magnetic strip and a plastic cover patch onto the curtain. Three applicator units are preferably utilized, with one such unit substantially aligned with the center of the curtain and the remaining two units being located along the longitudinal edges thereof. In operation, a thin, flexible plastic film is unwound onto an assembly table whereupon it is stopped at a predetermined position. In a first mounting assembly portion of each corresponding applicator unit, a predetermined length of a flexible magnetic ribbon is advanced from a first feed roll and a portion is severed therefrom. This severed portion is thereafter picked up by an applicator arm and transported to a second mounting assembly, where it is deposited upon a web of material utilizes to form the corresponding cover patches. Subsequently, a portion of the web is severed by a die-punch and the resultant cover patch and accompanying magnetic segment are moved into contact relation with the flexible substrate and bonded thereto.

44 Claims, 6 Drawing Sheets

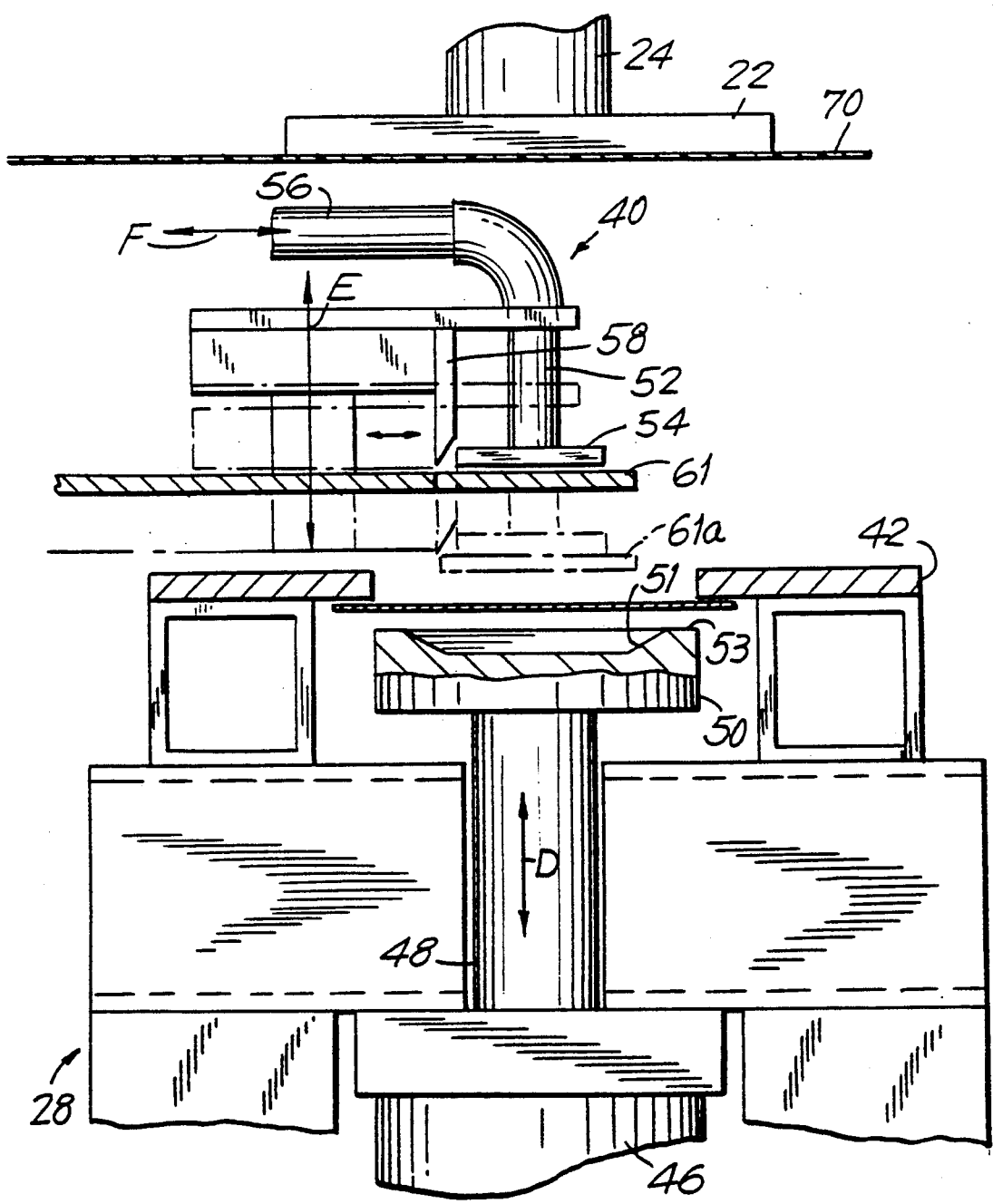

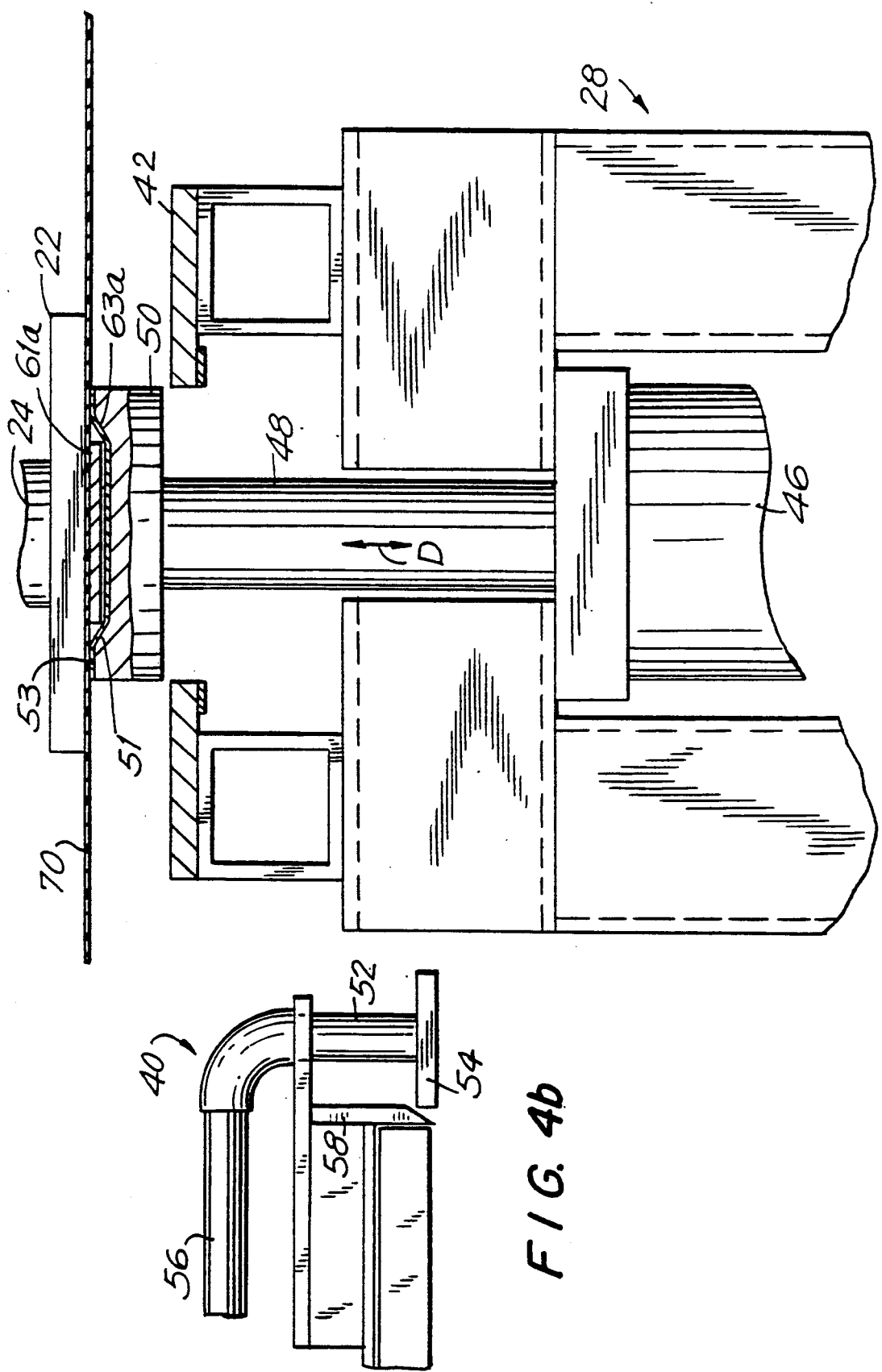

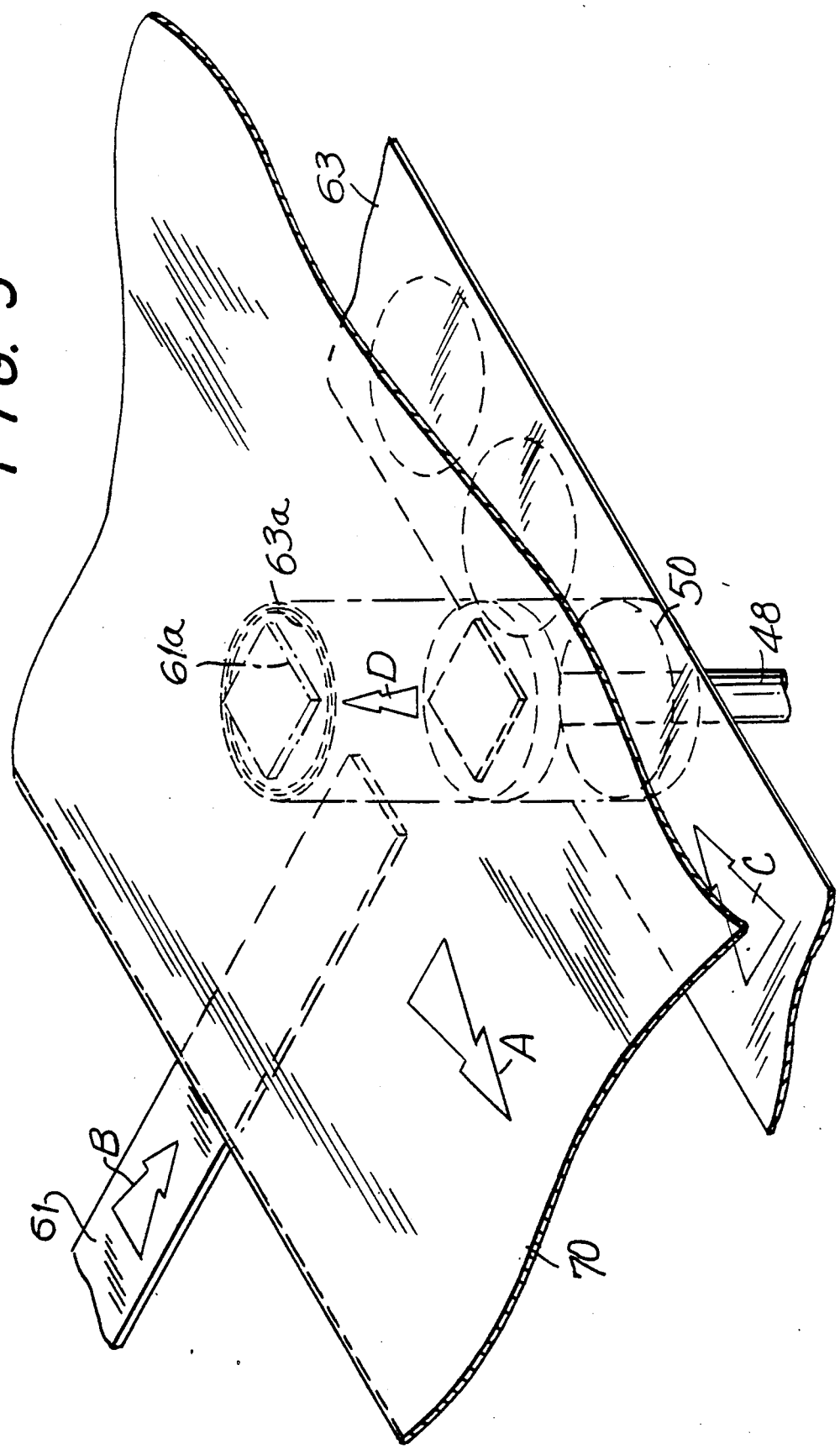

METHOD AND APPARATUS FOR LAMINATING FLEXIBLE MAGNETIC STRIPS ONTO FLEXIBLE PLASTIC SUBSTRATES

TECHNICAL FIELD

The invention relates to a method and apparatus for applying magnetic strips or segments onto plastic substrates and, more particularly, to a method and apparatus for laminating flexible magnetic strips onto thin, flexible plastic substrates during the in-line production of shower curtains and/or curtain liners. The invention also includes novel shower curtains and curtain liners produced by this method and apparatus.

BACKGROUND ART

It is well known in the prior art to form laminated articles comprising layers of thermoplastic film through the application thereto of heat and pressure. This process has been used, for example, in the preparation of plastic identification cards which may contain photographs or other identification information and/or magnetically encoded strips. Examples of such cards are credit cards, bank cards, employee identification cards and passports.

One example of a process for laminating magnetic materials of the type described above to a plastic substrate is disclosed in U.S. Pat. No. 3,811,977 relating to a method of making magnetic identification cards. The process involves placing a plurality of magnetic strips in windows formed in a first rigid plastic core sheet, positioning a second rigid plastic sheet on top of the core sheet; said second sheet preferably being opaque, and heating sufficiently to fuse these sheets together to form a single card. In the application described above, the core material and the opaque sheet are both preferably formed of a rigid vinyl material.

Similarly, U.S. Pat. No. 3,821,060 discloses a method for making credit cards and the like wherein three layers of polyvinyl chloride acetate sheet stock are laminated together with a magnetic tape strip embedded near the upper surface thereof. Again, both the base material and the end product of this method are formed of a rigid plastic.

U.S. Pat. No. 4,100,011 relates as well to the production of laminated articles having magnetically encoded strips. The method disclosed by the reference comprises adhering a flexible, non-porous surface laminate sheet to a rigid core stock layer. Subsequently, a magnetically encoded ink is printed by way of a conventional silk-screening process onto the upper surface of the surface laminate film. Finally, the ink is allowed to dry and the laminate is thereafter subjected to a combination of heat and pressure to form the finished card.

Analogously, U.S. Pat. No. 4,441,945 discloses a process for laminating layers of thermoplastic film to a rigid core layer with the use of heat and pressure. This process comprises applying heat and pressure to selected window portions formed in the layers to prevent the distortion of pressure and temperature sensitive security features which may be bonded therein. The primary use of this process is for applying grid images, microfilm images, holograms and the like onto credit cards.

None of the methods or apparatuses disclosed by the references discussed above are, however, useful in applying a flexible magnetic strip to a thin, flexible plastic substrate. By "flexible," as that term is utilized herein, applicants mean not simply a material which is capable of bending without breaking, but rather, they refer to a material which is sufficiently thin to permit close adherence to a contoured underlying substrate exhibiting, for example, compound curvature, bends and/or bumps.

Thus, the advantage of the present invention, i.e., a method and apparatus for laminating flexible magnetic strips onto thin, flexible substrates, is to produce a flexible sheet, capable of conforming and adhering by magnetic attraction to contoured and irregularly shaped surfaces. The application of flexible magnetic strips onto a flexible substrate yields a flexible sheet which, as described above, is adapted to closely adhere to objects exhibiting compound curvature, bends and bumps. A flexible sheet as produced by the presently described process and apparatus may advantageously be used to fashion automobile coverings, flexible signs and the like. However, a particularly useful and preferred application for the method and apparatus described and claimed herein is to facilitate the application of flexible magnetic strips to flexible plastic substrates in the manufacture of shower curtains, shower curtain liners, draperies and the like.

A number of prior art references disclose the incorporation of rigid magnetic materials within such curtains and liners. For example, U.S. Pat. Nos. 2,212,326 and 3,107,361 disclose a process wherein rigid magnets are sewn into individual pockets along the lower edge of a shower curtain. The sewing operation required to form these pockets for these magnets, whether done by hand or with the aid of a machine, is a cumbersome and time-consuming operation which unduly increases manufacturing time and labor costs.

Shower curtains have also been developed which utilize a row of magnets either sewn or glued to the vertical edges of the curtain, while a corresponding row of magnets is mounted to the wall of the shower stall and oriented so as to attract the magnets attached to the curtain. Such arrangements are illustrated in U.S. Pat. Nos. 2,864,096 and 3,365,684. Thus, the magnetic fastening assembly disclosed by these references is not provided as an integral part of the curtain and the disadvantage in the use of such an arrangement lies in the amount of time and effort which the consumer must exert to install and align the magnets.

Other prior art references relate to magnetic devices which are designed to be detachably secured to a shower curtain by the consumer. For example, U.S. Pat. No. 3,000,016 discloses the use of a generally rectangular, rigid magnet having a correspondingly channel-shaped sleeve of magnetizable material surrounding the magnet on three sides. The magnet and its corresponding sleeve are arranged along the lower hem and on opposite sides of the curtain, with the rectangular magnet being placed on the side of the curtain which interfaces with the interior of the tub.

Another such detachable arrangement is illustrated in U.S. Pat. No. 3,282,328. This arrangement comprises a permanent, rigid magnet which is inserted into a hollow cavity formed within an accompanying plastic body. The plastic body is provided with a snap button and a mating fastener strap which secures the body to the lower edge of the curtain. Again, these are separate parts which are assembled by the consumer.

None of the above-described prior art references disclose the novel process and apparatus taught herein wherein flexible magnets are automatically laminated in-line onto a flexible plastic substrate such as a shower curtain. That is, several of the cited references disclose the application of magnetic strips onto rigid plastic substrates, while others disclose the application of hard ceramic or metallic magnets onto flexible plastic substrates. There are no references known to applicant, however, which divulge the application of flexible magnetic strips onto thin, flexible plastic substrates.

Since the flexible magnetic strips are applied as part of the "in-line" manufacturing process described herein, the consumer is offered an economically produced article, e.g., a shower curtain, which requires no further assembly. Moreover, the flexible magnetic strips utilized in applicants' process create a powerful magnetic field to engage the inner face of the tub while offering the additional advantage of conforming to the contours and irregularities on the surface of the tub. Moreover, flexible magnetic strips of the type described herein are corrosion and temperature resistant to extend the useful life of such a curtain.

SUMMARY OF THE INVENTION

The present invention thus relates to a method and apparatus for laminating flexible magnetic segments onto thin plastic substrates, such as during the in-line production of shower curtains and/or curtain liners and the novel articles produced thereby. Each aspect of the invention represents a significant improvement over previous products and manufacturing techniques.

The apparatus of the present invention is configured for use with typical shower curtain and/or curtain liner producing machines. The apparatus includes a substantially flat upper surface for receiving the curtain from the curtain producing machine and at least one laminating unit which automatically applies a flexible magnetic strip and a plastic cover patch onto the curtain. The plastic patch, preferably formed from the same material as the underlying curtain, is automatically positioned over the magnetic strip and sealed to the curtain in any conventional way so as to encase the magnet therebetween.

One object of the present invention is thus to provide a novel method and apparatus adapted for automatically laminating flexible magnetic segments onto thin plastic substrates.

Another object of the present invention is to provide a method and apparatus adapted to facilitate the production of shower curtains and/or curtain liners having magnets attached adjacent the bottom hem thereof.

A further object of the present invention is to provide a method and apparatus which advantageously incorporates a roll of flexible magnetic material to permit the application of flexible magnetic segments onto flexible substrates instead of the brittle ceramic magnets currently in use in the manufacture of such products.

The present invention thus relates to a method and apparatus for laminating flexible magnetic strips or segments onto a flexible plastic substrate. The assembly designed by applicants for this purpose comprises a support frame, preferably of welded construction, having a smooth, flat table extending across its upper surface to facilitate the passage thereacross of the flexible plastic substrate. In one embodiment of the invention, the support frame may be provided with wheeled leg members to permit the assembly to be moved between work stations as the need arises.

The assembly further comprises at least one laminating unit adapted for laminating a segment of a flexible magnetic material and a covering patch adjacent a lower edge of the plastic substrate. The laminating unit(s) is/are located below the surface of the table and thus adjacent a "rear" surface of the substrate (that is, the surface to which the magnetic segments are to be applied) as it passes thereover. The table top is thus provided with apertures corresponding to the location of each said laminating unit to permit the passage therethrough of a flexible magnetic segment and covering patch as discussed below.

In a preferred embodiment of the invention, three such laminating units are utilized, with one such unit situated substantially in the center of the substrate's bottom edge and the remaining units being positioned, respectively, along the left and right longitudinal surfaces of the plastic sheet. The laminating units are adjacently mounted to the support frame to permit them to be relocated as required for a variety of applications.

Moreover, each laminating unit has a corresponding anvil, mounted by an anvil support member suspended above the "front" (i.e., opposite the "rear") lower surface of the substrate and directly in line with the corresponding laminating unit. The anvils provide a solid backing for that portion of the substrate to which the magnetic strips are to be laminated to prevent ripping or tearing of the substrate during the process.

The laminating units are comprised of first and second mounting assemblies, wherein the first such assembly comprises a feed reel for supplying the flexible magnetic strip and an applicator arm for cutting and positioning the magnet on the substrate. The second mounting assembly comprises a corresponding feed reel containing a web of patch material, a die-punch assembly for cutting a preshaped segment of patch material out of the web and a sealing head adapted for bonding, e.g., by heat sealing, both the respective strip and the overlying patch to the rear surface of the substrate.

In operation, therefore, a thin plastic (e.g., PVC) film is unwound from a master roll onto a conveyor. As the film passes across the upper planar surface of the assembly table, it is stopped at a predetermined position by an appropriate sensor or timing means so that the laminating unit(s) is/are appropriately located adjacent the bottom edge of the plastic material. The applicator arm is extended and a preselected portion of the magnetic material is advanced from the feed reel. As the applicator arm descends it cuts a segment of the magnet from the reel, which is then engaged by a suction plate attached at the end of the applicator arm and maintained in position thereupon due to suction provided by the applicator arm. The leading edge of the magnetic strip remaining on the feed reel is then rotated back, out of the way, to prevent its trailing edge from interfering with the laminating process.

The applicator arm is further extended to a position directly above the aperture defined by the die, and when the vacuum supplied to the applicator arm is deactivated, the cut segment of magnetic material is permitted to fall through the aperture in the die onto the surface of the patch material provided by the second mounting assembly. Thereafter, the applicator arm returns to its retracted position.

Subsequently, the entire second mounting assembly is driven upwardly to place the die portion thereof in proximity to the corresponding anvil on the other side of the substrate. Next, the punch with its accompanying sealing head portion is driven upwardly so as to pass through the die and thus to sever a correspondingly shaped patch from the web of patch material which, along with the magnetic strip lying atop the patch, i.e., between the patch and the plastic substrate, is forced upwardly into contact with the lower rear edge of the plastic film backed by one of the corresponding anvils. The magnet with its accompanying patch is then laminated to the substrate, preferably by a process such as sonic welding. Once the seal is formed, the punch is returned to its original position and the plastic sheet is advanced to permit the next laminating operation.

BRIEF DESCRIPTION OF THE DRAWINGS

FIG. 4a is a view, partially in section, taken along line 4—4 of FIG. 3 illustrating the magnetic material applicator arm in an extended position;

FIG. 4b is another view along line 4—4 of FIG. 3 showing the magnetic material applicator arm in its retracted position; and FIG. 5 is a perspective view illustrating the sequence of steps in the method of laminating flexible magnetic strips onto thin, flexible plastic substrates.

DETAILED DESCRIPTION OF THE PREFERRED EMBODIMENTS

Figure 1:
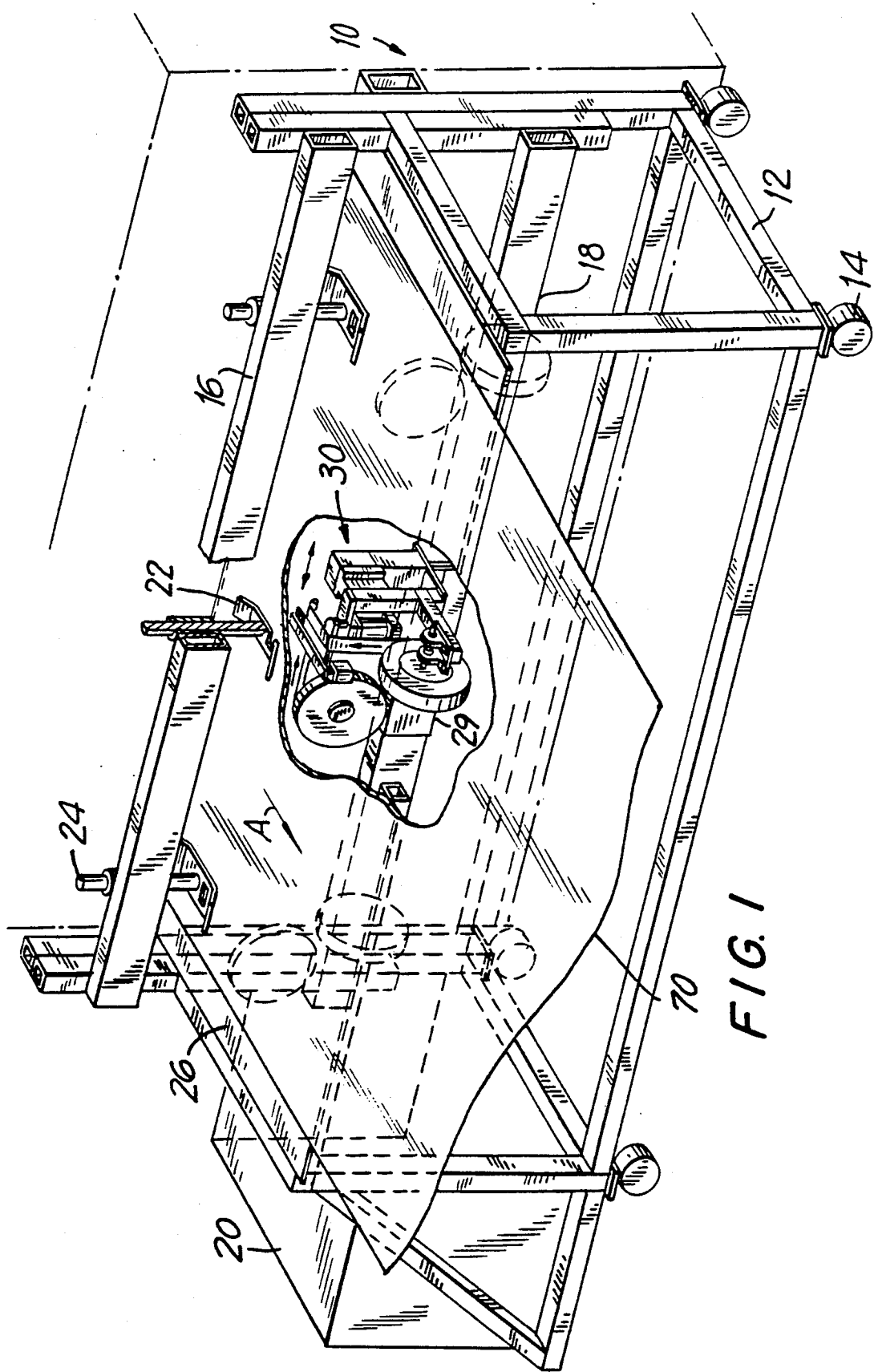
FIG. 1 is a perspective view of the apparatus according to the present invention.

Referring initially to FIG. 1, there is illustrated apparatus 10 configured and adapted for laminating flexible magnetic strips onto a thin, flexible plastic substrate 70 traveling across an upper surface of apparatus 10 in the direction of arrow A. Apparatus 10 is designed to be compatible with a wide range of flexible sheet producing machines well known in the art and comprises: support frame 12 having wheels 14 to facilitate the movement of frame 12 to alternate work stations, upper mounting member 16; lower mounting member 18; at least one laminating unit 30, movably mounted to lower mounting member 18; at least one anvil 22, each said anvil 22 movably mounted to upper mounting member 16 to permit the alignment of one such anvil with each laminating unit 30; and power source 20.

Only one laminating unit 30 is actually shown in FIG. 1 but two additional such units (shown in phantom) positioned adjacent the longitudinal edges of frame 12, are preferred for use in the present invention.

Support frame 12 comprises a rectangular table-shaped weldment constructed of any suitable material, such as carbon steel, having a planar upper surface 26 attached thereto in any conventional manner. Upper surface 26 is preferably configured in the form of a flat table top and constructed of stainless steel to provide a smooth, wear-resistant surface for plastic substrate 70 to pass over. As noted above, wheels 14 render apparatus 10 mobile so that the apparatus may be moved from station to station as need requires.

Upper and lower mounting members 16 and 18, respectively, are structural members of any cross section and material sufficient to support the weight of the equipment attached thereto. In the preferred embodiment, members 16 and 18 have a hollow rectangular cross section to maximize the surface area for the attachment of, respectively, anvils 22 and laminating units 30. The mounting members are adjustably joined to support frame 12 by, for example, peg or bracket means, so that they may be raised or lowered accordingly to provide a compatible interface with any existing flexible sheet producing machine.

Lower mounting member 18 provides structural support for laminating units 30 which are slideable thereon and removeably mounted thereto. Mounted in this fashion, units 30 can be adjustably positioned or removed as desired, according to the width of the substrate 70 to which the flexible magnetic strips are to be laminated, the desired number of magnets to be attached, and the spacing of these magnets.

Upper mounting member 16 similarly provides structural support for anvils 22 which are slideably and removeably mounted by anvil support members 24. Anvils 22 preferably correspond in number and location to the position of laminating units 30 along lower mounting member 18.

Support frame 12 also provides structural support for power source 20, disclosed in representative fashion, which drives each laminating unit 30. Power source 20 may be, for example, any suitable gas or electrically powered motor means which supplies sufficient power to operate laminating units 30 of the present invention.

Figure 2:
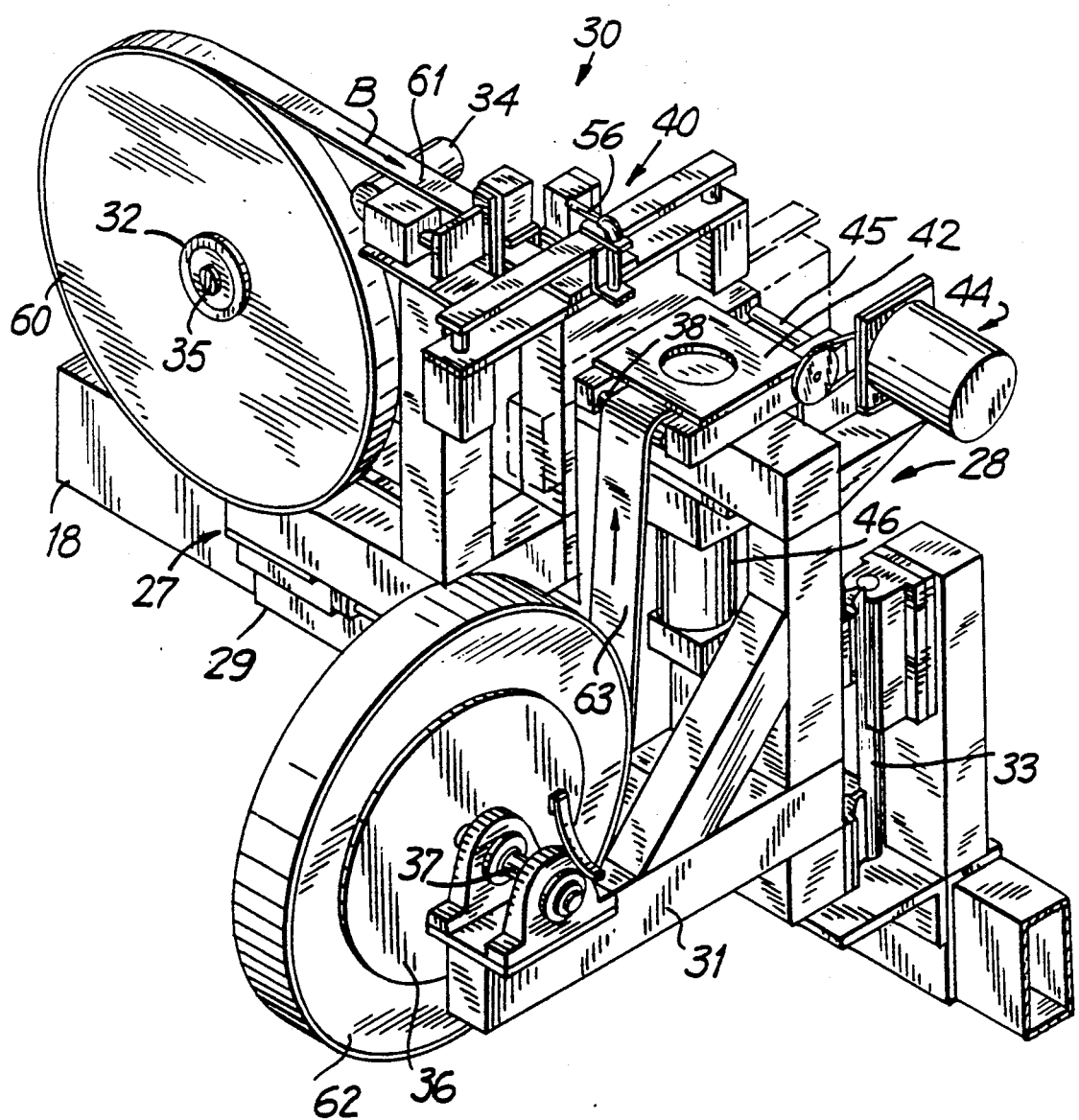
FIG. 2 is a perspective view of a laminating unit portion of the apparatus in FIG. 1 with its magnetic material applicator arm in a retracted position.
Figure 3:
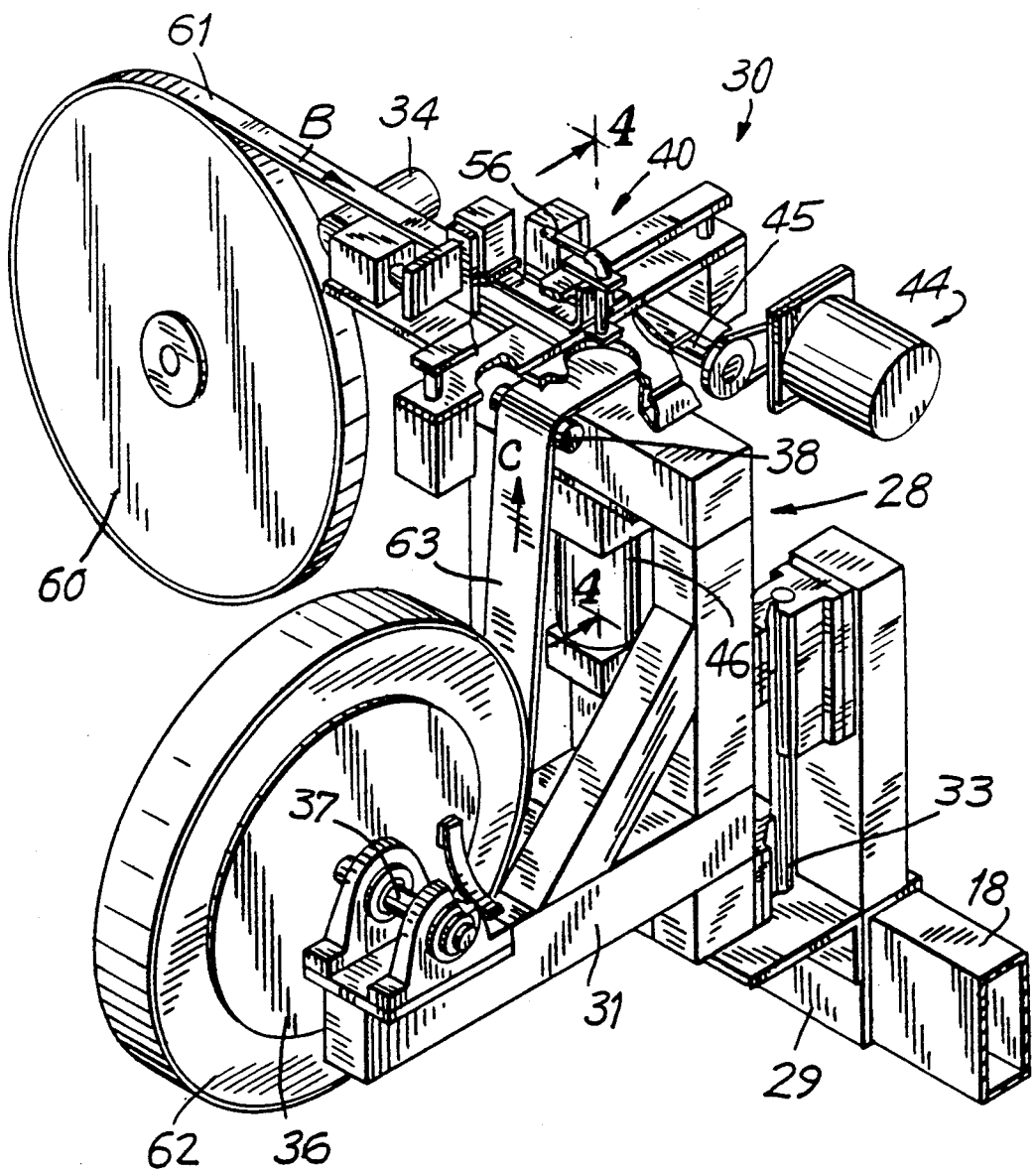
FIG. 3 is a perspective view of the laminating unit of FIG. 2 similar to that of FIG. 2 but with the magnetic material applicator arm in an extended position.

FIGS. 2 and 3 are enlarged isometric views of a representative laminating unit 30, each such unit being comprised of a first mounting assembly 27 which supports first feed reel 32 for storing and supplying the flexible magnetic material, first material roller 34 and magnetic material applicator arm 40; and a second mounting assembly 28 which supports second feed reel 36 adapted for supplying a web of patch material which is laminated (over the magnetic segment) to the rear surface of the overlying substrate in a manner described in detail below, second material roller 38, die 42, and tension drive 44. Second mounting assembly 28 further comprises (as illustrated in FIGS. 4a, 4b and 5), horn 46, punch 48 and sealing head 50. As noted above, in the preferred embodiment of the invention, three such laminating units 30 are mounted along lower mounting member 18 by means of bracket 29.

First and second feed reels 32 and 36 provide rotatable support, respectively, for first and second material rolls 60 and 62. Preferably, roll 60 comprises a continuous strip of flexible magnetic material 61 and roll 62 comprises a continuous strip of flexible patch material 63. By "flexible," applicants reiterate that they mean material capable of conforming or adapting to an irregularly contoured underlying substrate by bending, twisting, turning or warping without breaking.

Feed reels 32 and 36 are simply designed and easily accessible to the worker charged with operating the device so that new rolls of material can be easily installed. Examples or suitable magnetic material are disclosed in U.S. Pat. Nos. 3,124,725 to Leguillon, 3,191,106 and RE 29,451 to Baermann and 3,764,539 to Cochardt et al. One commercially available product which is particularly suited for use in the present invention is sold under the trade name Ultra-Mag ® by Magnets Incorporated of Cincinnati, Ohio. Ultra-Mag ® is available in rolls of convenient thickness and width for numerous applications. Flexible patch material 63 is preferably a web of polyvinyl chloride, i.e., PVC, but any other flexible material capable of being laminated to the proposed flexible substrate may also be used.

First feed reel 32 comprises means for rotatably mounting first material roll 60 as well as means to secure the roll in position. Preferably, the mounting means is an axle or shaft 35 which mates with an aperture through a center portion or roll 60. Magnetic material 61 is drawn from roll 60 on feed reel 32 by the clockwise rotation of first material roller 34 First material roller 34 is preferably a solenoid which pulls the magnetic material in the direction of arrow B as shown in FIGS. 2 and 3. Magnetic material 61 from roll 60 passes over first material roller 34 to a location where a portion thereof is severed and subsequently applied to flexible substrate 70 as described below.

FIGS. 4a and 4b are fragmentary views, partially in section, showing in further detail the configuration and movements of applicator arm 40 as well as punch 48 and sealing head 50. Magnetic applicator arm 40 is equipped with blade 58, section nozzle 52 and suction plate 54. Applicator arm 40 may be attached to any suitable vacuum source (not shown) by vacuum hose 56 which supplies vacuum pressure to suction plate 54. The vacuum pressure supplied by this source is sufficient to enable suction plate 54 to pick up and hold a small segment of flexible magnetic material 61a once this segment is cut off of continuous magnetic strip 61 by blade 58. The vacuum pressure supplied to suction plate 54 may alternatively be switched on or off as described below.

Applicator ar 40 is capable of reciprocal lateral and longitudinal movement in the direction of arrows E and F. The motion represented by arrow F permits applicator arm 40 to be positioned so that suction plate 54 is directly aligned with punch 48. The motion represented by arrow E allows blade 58 and suction plate 54 to descend toward the magnetic material to facilitate cutting and applying magnetic segment 61a.

When applying a segment 61a of magnetic material, applicator arm 40 moves in the direction of arrow F until suction plate 54 and punch 48 are aligned. Applicator arm 40 then descends along the direction of arrow E to engage and cut segment 61a of magnetic material and place that segment onto a portion of the web of patch material 63. Just prior to physical contact with magnetic material 61 from roll 60, the vacuum supply to suction plate 54 is activated so that plate 54 can firmly engage segment 61a. The downward force of applicator arm 40 is sufficient to cause blade 58 to sever segment 61a from magnetic material 61 provided by roll 60.

After cutting segment 61a of flexible magnetic material, applicator arm 40 is further lowered towards die 42. At this point, the vacuum supply to suction plate 54 is deactivated, allowing segment 61a to drop into position atop patch material 63, directly above punch 48. Application arm 40 is thereafter raised in the direction of arrow E and retracted along the direction of arrow F to permit application of segment 61a and patch material 63 to substrate 70 by punch 48 and sealing head 50 without interference.

Second feed reel 36 is attached to second mounting assembly 28 by means of cantilever beam 31. Second mounting assembly 28 is in turn moveably mounted to bracket 29 by linear bearing 33, which allows assembly 28 to be driven in a vertical upward and downward direction. The driving force may be supplied by any suitable motor means (not shown) which is capable of supplying sufficient power to drive second mounting assembly 28 through a predetermined distance.

Second feed reel 36 comprises mounting means, preferably axle 37, which rotatably supports second material roll 62 and means to secure roll 62 in position, which is preferably a cotter pin or a threaded wing nut to allow for rapid removal and replacement of roll 62. Patch material 63 is wound from roll 62 in a way such that material 63 lies in a substantially vertical plane. Patch material 63 continues upwardly until it encounters second material roller 38 whereupon it is wound into a horizontal plane. Patch material 63 then passes beneath die 42 in direct alignment with the aperture defined thereby and above sealing head 50, and encircles axle 45 of tension drive 44. Tension drive 44 is any suitable mechanism which supplies the necessary tension to the web of patch material 63, thus permitting patches 63a to be punched therefrom and which advances the remaining web material after each successive punch, whereupon the remainder of the web is thereafter collected.

Die 42 and punch 48 are used in combination to punch patches 63a from patch material 63. Die 42 is a flat plate defining a centrally located aperture through which punch 48 passes. As shown in FIGS. 4a and 4b, punch 48 is a vertical shaft which is driven in the direction of arrow D by horn 46 and has sealing head 50 attached at its uppermost end. Horn 46 is a device which supplies the requisite driving force to punch 48 by means of pneumatic, hydraulic or electrical energy. Punch 48 is illustrated as having a cylindrical shape, but it may also be rectangular, oblong or any other suitable shape.

Sealing head 50 is a short cylindrical section of punch 48 designed to be driven through the hole in die 42 by punch 48, thereby cutting circular patch 63a from the web of patch material 63. While sealing head 50 may have any regular or irregular shaped perimeter, a circular perimeter is preferred because it provides lower tooling and maintenance costs.

Sealing head 50 is equipped with recess 51 formed in its upper surface. Heat sealing means 53 are located around the perimeter of this upper surface to facilitate the application of magnetic segment 61a and patch 63a onto flexible substrate 70 to which these materials are to be applied. The depth of recess 51 is most preferably at least equal to the cumulative thickness of magnetic segment 61a and patch 63a. The heat sealing process may be accomplished with the use of, for example, hot air or dielectric means or any other available technique to ensure a firm bond between patch 63a and flexible substrate 70. The preferred sealing head, however, comprises a radio-frequency heat sealer which emits ultrasonic sound waves in a shear direction with respect to patch 63a and substrate 70 thereby causing a sonic weld to therebetween. This process depends primarily on the sonic energy and the clamping force supplied between sealing head 50 and anvil 22. Such heat sealing means are well known in the prior art and thus require no further description.

Returning to FIG. 1, for each laminating unit 30, there is a corresponding anvil 22 which is mounted to upper mounting member 16 on the opposite side of substrate 70 from laminating unit 30 and in line therewith by anvil support member 24. Anvil 22 serves as a backing support to sealing head 50 when the sealing of patch 63a to substrate 70 is required. Anvil 22 comprises a rigid flat plate having a perimeter somewhat greater than the perimeter of sealing head 50. Anvil support member 24 is any suitable member which firmly secures anvil 22 to mounting member 16 but which also allows the anvil to be removed or relocated anywhere along the length of upper mounting member 16.

While apparatus 10 described herein has a wide range of applications, the preferred use is for the attachment of flexible magnets onto lightweight polyvinyl chloride (PVC) sheets during the in-line production of shower curtains and/or curtain liners. One particular advantage of apparatus 10 is the fully automated attachment of the magnetic material which was previously done by hand. This is made possible by the use of flexible magnets which are available in convenient rolls of material.

Apparatus 10 of the current invention automatically performs the operation of simultaneously applying 3 or more segments 61a of magnetic material to substrate 70 within about 2-10 seconds and preferably within about 4-6 seconds. With this increased efficiency, apparatus 10, when used in combination with existing shower curtain and/or curtain liner producing machines, can produce upwards of 5,000 shower curtains per day. This productivity marks a substantial improvement over the current state of the art which requires the application of comparatively rigid magnetic material by hand. Hand application involves hand cutting a segment of magnetic material, placing the cut segment onto the shower curtain, hand cutting a segment of patch material, placing and aligning the patch material on the shower curtain and heat sealing the patch thereto.

Moreover, the use of flexible magnets eliminates the problems associated with the rigid ceramic magnets previously employed on shower curtains and/or curtain liners. Ceramic magnets, for example, are relatively brittle and thus difficult to cut, awkward to work with and are not available in convenient stock. Rolls of flexible magnetic material are available in sufficiently large sizes such that the rolls would normally require replacement as little as five times during an average production day.

Ceramic or ferrite magnets, on the other hand, are only available in smaller stock, thus requiring a new supply every 30 minutes at the rate of production offered by the apparatus of the present invention. In addition, preformed or precut segments of ceramic magnet are more expensive than long strips of the material and tend to stick together due to their strong magnetic attraction.

Furthermore, flexible magnets offer the advantage of conforming to irregular shapes and contours, such as those exhibiting compound curvature, bends and bumps, to ensure intimate contact of the curtain or curtain liner to the bath tub or shower stall. Such contact is desirable to prevent the billowing of the curtain and the subsequent onrush of cold air and splashing of water onto the bathroom floor.

Turning now to the operation of apparatus 10 for the production of shower curtains and/or curtain liners, FIGS. 4a and 4b show the respective motions of applicator arm 40 and punch 48 during application of magnetic strip 61a and patch 63a to substrate 70. FIG. 5, meanwhile, snows the direction of travel of the respective materials during operation of apparatus 10.

Typical shower curtain production involves unwinding vinyl film 70 from a master roll onto an accumulator conveyor. Film 70 is then fed into a dielectric sealing press where a reinforcing strip of heavier gauge film is fed across the top of the web. The dielectric press seals the reinforcement strip onto the web while simultaneously forming the shower hook holes. A perforated tear strip is then formed at the bottom of the certain below the hem thereof.

The top of shower curtain 70 passes downstream from the curtain producing machine (not shown) onto the upper surface of table top 26 in the direction of arrow A as shown in FIG. 1. Curtain 70 is stopped at a predetermined position by any conventional optic or tactile sensor or timing device so that laminating units 30 are in close proximity (between about 1 to 5 inches) to the bottom hem of curtain 70.

Magnetic material applicator arm 40 moves from its retracted position, shown in FIG. 4b, to a position directly above punch 48 shown in FIG. 4a. At the same time, first material roller 34 rotates in the clockwise direction, thereby advancing the magnetic material a predetermined distance in the direction of arrow B. Applicator arm 40 then descends in the direction of arrow E while a vacuum is supplied to suction plate 54. Blade 58 severs a segment 61a of flexible magnetic material 61a which is firmly engaged and maintained in position by suction plate 54.

First material roller 34 then rotates slightly in the reciprocal counterclockwise direction to rewind magnetic material 61 so that a trailing edge thereof does not extend far enough so as to interfere with punch 48. Meanwhile, tension drive 44 causes second feed reel 36 to rotate in the counterclockwise direction, thereby advancing patch material 61 in the direction of arrow C. Applicator arm 40 continues to descend until the lower surface of magnetic segment 61a is at substantially the same level as the upper surface of die 42.

The vacuum pressure supplied to suction plate 54 is then deactivated, thereby allowing magnetic segment 61a to fall through an aperture defined by die 42 onto the upper surface of patch material 63. After releasing flexible magnetic segment 61a, applicator arm 40 returns to the retracted position as shown in FIG. 4a.

Thereafter, as shown in FIG. 4b, a power source (not shown) is activated, which drives the entire second mounting assembly 28 upwardly along linear bearing 33 such that die 42 is placed in close proximity to anvil 22, on the opposite side of shower curtain 70. Horn 46 is subsequently activated, thereby driving punch 48 and sealing head 50 upward through the remaining distance in the direction of arrow D. The upward motion causes sealing head 50 and punch 48 to pass through the circular hole in die 42 thereby punching a circular patch 63a from patch material 63. Punch 48 is driven further upward until the upper surface of sealing head 50 contacts the lower surface of shower curtain 70, backed by anvil 22. Upon contact radio-frequency neat sealer 53 in sealing head 50 is activated. The radio frequency generated by sealer 53 is sufficient to cause a sonic weld to form around the perimeter of circular cover patch 63a between the patch and curtain 70 thereby laminating flexible magnetic segment 61a therebetween.

In an alternate embodiment, second mounting assembly 28 remains fixed to prevent any vertical movement thereby and subsequently, linear bearing 33 may be eliminated. Therefore, magnetic segment 61a and patch 63a are applied to shower curtain 70 by the upward stroke of punch 48 without the preceding upward movement of second mounting assembly 28. Referring to FIG. 4a, after applicator arm 40 retracts, punch 48 travels upward along the direction of arrow D from its initial position completely through the distance between the upper surface of die 42 and the lower surface of anvil 22. Thereafter, sealing head 50 is activated as described above to form a sonic weld between patch 63a and curtain 70. In this embodiment, punch 48 must be substantially longer than in the previously discussed embodiment to accommodate a longer stroke length. This embodiment eliminates the additional power requirement necessary for driving second mounting assembly 28.

Once the sealing operation is complete, horn 46 is deactivated, permitting punch 48 to return to its original position. Shower curtain 70 is removed by any suitable means and apparatus 10 is ready to engage the next curtain.

While it is apparent that the invention herein disclosed is well calculated to fulfill the objects above stated, it will be appreciated that numerous embodiments and modifications may be devised by those skilled in the art, and it is intended that the appended claims cover all such modifications and embodiments as fall within the true spirit and scope of the present invention.

We claim:

1. An apparatus for laminating segments of a flexible magnetic material to a flexible plastic substrate, said apparatus comprising:
   a. means for supplying an adjustable length segment of a flexible plastic substrate to a support frame configured with a substantially planar upper work surface adapted to facilitate passage of said flexible substrate thereacross from a first edge to a second edge thereof, said substrate having a front surface and an opposed rear surface;
   b. a support frame comprising
      1. a plurality of interconnected leg members adapted to support a substantially flat, smooth upper work surface, said upper work surface defining at least one aperture therethrough to permit access by at least one corresponding laminating means, positioned below said work surface, to said rear surface of said plastic substrate as said substrate moves across said work surface;
      2. an adjustably positioned upper mounting member located transversely above said upper work surface and configured and adapted to support at least one anvil means providing backing support for said front surface of said substrate during lamination of said flexible magnetic segments to said rear surface thereof;
      3. an adjustably positioned lower mounting member extending substantially parallel to said upper mounting member and below said upper work surface, said lower mounting member configured and adapted for supporting at least one laminating means;
      4. at least one laminating means adjustably positioned upon said lower mounting member, each said laminating means being mounted in substantial alignment with one of said anvil means and adapted to laminate to a rear surface of said substrate, a segment of said flexible magnetic material together with a correspondingly positioned segment of a cover patch material placed thereover to maintain said magnetic material in contact with said substrate; and
   c. motor drive means, connected to said at least one laminating means and capable of providing sufficient power to operate said laminating means.

2. The apparatus of claim 1 which comprises three said laminating means, slideably and removably mounted upon said lower mounting member.

3. The apparatus of claim 2 wherein each said laminating means comprises:

a. a first mounting assembly adapted for severing a segment of said flexible magnetic material unwound from a first supply roll thereof and thereafter transporting said segment from a first location to a second location wherein said segment is deposited upon a corresponding web of cover patch material; and
   b. a second mounting assembly for laminating a segment of said cover patch material and said flexible magnetic segment to said rear surface of said flexible substrate in a manner so as to maintain said magnetic segment in substantially permanent contact with said substrate.

4. The apparatus of claim 3 wherein said first mounting assembly comprises:
   a. a first feed reel adapted for supplying a rolled ribbon of said flexible magnetic material to first roller means;
   b. first roller means located downstream from said first feed reel and operatively associated therewith for advancing a portion of said flexible magnetic ribbon in the direction of magnetic material applicator means adapted for severing a predetermined length segment thereof, said first roller means further being adapted to permit rotation thereof in a reverse direction for at least partially retracting a leading uncut edge of said flexible magnetic ribbon from a location adjacent said second mounting assembly to prevent any interference between said ribbon and said second mounting assembly; and
   c. magnetic material applicator means adapted for severing a portion of said flexible magnetic ribbon at a first location and transporting said severed portion to a second location removed a distance therefrom.

5. The apparatus of claim 4 wherein said magnetic material applicator means comprises:
   a. cutting means for separating a segment of said magnetic material from said rolled ribbon thereof at said first location; and
   b. means for transporting said magnetic segment to said web of said cover patch material located at said second location and depositing said segment onto an adjacent upper surface of said web,
   said applicator means being capable of independent reciprocal lateral and longitudinal movement in relation to said first mounting assembly.

6. The apparatus of claim 5 wherein said cutting means is a sharpened blade removably affixed to said transporting means.

7. The apparatus of claim 5 wherein said transporting means comprises:
   a. a vacuum hose having a first end and a second end, said first end being attached to means adapted for creating a vacuum within said hose; and
   b. a suction plate member secured to said second end of said vacuum hose, said plate member adapted to facilitate, in the presence of a vacuum within said hose, adherence of said magnetic segment to said transporting means, to permit the transport of said flexible magnetic segment from said first location to said second location, said vacuum thereafter being deactivated to permit said flexible magnetic segment to be deposited upon said upper surface of said web of cover patch material.

8. The apparatus of claim 4 wherein said second mounting assembly comprises:

a. a second feed reel adapted for supplying a web of said cover patch material to second roller means;

b. second roller means located downstream from said second feed reel and operatively associated with said second feed reel for advancing said web of cover patch material in the direction of die-punch assembly means operatively associated therewith;

c. die-punch assembly means adapted for severing a portion of said cover patch material from said web and laminating said magnetic segment and said corresponding cover patch portion to said rear surface of said flexible plastic substrate; and d. tension drive means for adjusting the tension of said web of cover patch material as said web passes through said die-punch assembly.

9. The apparatus of claim 8 wherein said second mounting assembly is movably mounted upon said laminating means by a bearing to allow said second assembly to be driven in a vertical upward and downward direction by said motor drive means.

10. The apparatus of claim 8 wherein said die-punch assembly means comprises:

a. a substantially flat die member defining an aperture therein adapted for the passage of a least an upper portion or a punch assembly therethrough; and b. a punch assembly comprising 1. an elongated vertical shaft having a first upper end and a second lower end, said shaft adapted for reciprocal upward and downward movement so as to permit at least said upper end to reciprocally move through said aperture in said die member;

2. horn means operatively associated with said second lower end of said shaft for supplying a driving force to said shaft; and 3. a sealing head forming at least a portion of said first upper end of said shaft, said sealing head adapted for severing a portion of said cover patch material from said web and thereafter laminating said patch over said magnetic segment upon said rear surface of said flexible plastic substrate.

11. The apparatus of claim 10 wherein said sealing head is equipped with a recess in an uppermost horizontally planar surface thereof, said recess being at least equal in depth to the cumulative thickness of said magnetic segment and said cover patch.

12. The apparatus of claim 11 wherein said recess in said sealing head is substantially surrounded by sealing means to facilitate bonding said magnetic segment and said corresponding cover patch to said substrate.

13. The apparatus of claim 12 wherein said sealing means is a heat sealer.

14. An apparatus for laminating segments of a flexible magnetic material to flexible plastic curtain materials, said apparatus comprising:

a) means for supplying an adjustable length segment of a plastic curtain material to a support frame configured with a substantially planar upper work surface adapted to facilitate passage of said curtain material thereacross, said curtain having a front surface and an opposed rear surface;

b) a support frame comprising 1. plurality of interconnected leg members adapted to support a substantially flat, smooth upper work surface, said upper work surface defining at least one aperture therethrough to permit access to said rear surface of said curtain by a plurality of laminating units positioned below said work surface, as said curtain moves across said work surface;

2. an adjustably positioned upper mounting member located transversely above said upper work surface and configured and adapted to support anvil means correspondingly located and aligned with each said laminating unit, wherein said anvil means provide backing support for said front surface of said curtain during the lamination of said flexible magnetic segments to said rear surface thereof;

3. an adjustably positioned lower mounting member extending substantially parallel to said upper mounting member and below said upper work surface, said lower mounting member configured and adapted for supporting said plurality of laminating units;

4. a plurality of laminating units adjustably positioned upon said lower mounting member, each said laminating unit comprising:

(i) a first mounting assembly adapted for severing a segment of said flexible magnetic material unwound from a first supply roll thereof and thereafter transporting said segment from a first location to a second location wherein said segment is deposited upon a corresponding web of cover patch material, wherein said first mounting assembly comprises (a) a first feed reel adapted for supplying a rolled ribbon of said flexible magnetic material to a first roller:

(b) a first roller located downstream from said first feed reel and operatively associated therewith for advancing a portion of said flexible magnetic ribbon in the direction of a magnetic material applicator arm adapted for severing a predetermined length segment thereof, wherein said first roller is further adapted to permit rotation thereof in a reverse direction for at least partially retracting a leading uncut edge of said flexible magnetic ribbon from a location adjacent said second mounting assembly to prevent any interference between said leading edge and said second mounting assembly; and (c) a magnetic material applicator arm located downstream from said first roller and adapted for severing a portion of said flexible magnetic ribbon supplied by said first feed reel at a first location and thereafter transporting said segment to a second location wherein said segment is deposited upon said web of cover patch material, and (ii) a second mounting assembly adapted for laminating a segment of said cover patch material and said flexible magnetic segment to said rear surface of said plastic curtain in a manner so as to maintain said magnetic segment in substantially permanent contact with said curtain, said second mounting assembly comprising (a) a second feed reel adapted for supplying a web of cover patch material to a second roller;

(b) a second roller located downstream from said second feed reel and being operatively associated therewith for advancing said web of cover patch material in the direction of die-punch assembly means located downstream therefrom;

(c) die-punch assembly means adapted for severing a portion of said cover patch material from said web and laminating said magnetic segment and said corresponding cover patch portion to said rear surface of said plastic curtain; and (d) tension drive means adapted for adjusting the tension of said web of cover patch material as said web passes through said die-punch assembly means, and 5. motor drive means connected to said laminating units to provide sufficient power to operate said units.

15. The apparatus of claim 14 wherein said motor means is selected from the group consisting of gas and electrically powered motors.

16. The apparatus of claim 14 which comprises three said laminating means, slideably and removably mounted upon said lower mounting member.

17. The apparatus of claim 14 wherein said magnetic material applicator arm comprises:

a. blade means removably affixed to accompanying transporting means for separating, at said first location, a segment of said magnetic material from said ribbon thereof; and b. means for transporting said magnetic segment from said first location to said web of cover patch material located at said second location, and depositing said segment onto an adjacent upper surface of said web, said applicator arm being capable of independent reciprocal lateral and longitudinal movement in relation to said first mounting assembly.

18. The apparatus of claim 17 wherein said transporting means comprises:

a. a vacuum hose having a first end and a second end, said first end being attached to means adapted for creating a vacuum within said hose; and b. a suction plate member secured to said second end of said vacuum hose, said plate member adapted to facilitate, in the presence of a vacuum within said hose, adherence of said magnetic segment to said applicator arm, to permit transport of said flexible magnetic segment from said first location to said second location, said vacuum thereafter being reactivated to permit said segment to be deposited upon said upper surface of said web of cover patch material.

19. The apparatus of claim 14 wherein said second mounting assembly is movably mounted upon said laminating means by a bearing to allow said second assembly to be driven in a vertical upward and downward direction by said motor drive means..

20. The apparatus of claim 14 wherein said die-punch assembly means comprises:

a. a substantially flat die member defining an aperture therein adapted for the passage of a least an upper portion or a punch assembly therethrough; and b. a punch assembly comprising 1. an elongated vertical shaft having a first upper end and a second lower end, said shaft adapted for reciprocal upward and downward movement so as to permit at least said upper end to reciprocally move through said aperture in said die member;

2. horn means operatively associated with said second lower end of said shaft for supplying a driving force to said shaft; and 3. a sealing head forming at least a portion of said first upper end of said shaft. said sealing head adapted for severing a portion of said cover patch material from said web and thereafter laminating said patch over said magnetic segment upon said rear surface of said flexible plastic curtain.

21. The apparatus of claim 20 wherein said sealing head is equipped with a recess in an uppermost horizontally planar surface thereof, said recess being at least equal in depth to the cumulative thickness of said magnetic segment and said corresponding cover patch.

22. The apparatus of claim 21 wherein said recess in said sealing head is substantially surrounded by sealing means to facilitate bonding said magnetic segment and said corresponding cover patch to said substrate.

23. The apparatus of claim 22 wherein said sealing means is a heat sealer.

24. The apparatus of claim 23 wherein said heat sealer is a radio frequency heat sealer adapted to form a sonic weld between said patch and said plastic curtain.

25. The apparatus of claim 14 wherein said first roller is a solenoid adapted, upon actuation, to pull a predetermined length or said magnetic ribbon off of said first feed reel.

26. The apparatus of claim 14 wherein said support frame is provided with wheels located upon said leg members to facilitate movement of said frame between work stations.

27. A process for laminating at least one segment of a flexible magnetic material onto a surface of a flexible plastic substrate, said process comprising:

a. supplying, at a first work station, an adjustable length segment of a flexible plastic substrate from a continuous length thereof, said substrate having opposed front and rear surfaces;

b. advancing a predetermined length of a flexible magnetic ribbon from first feed means to a location adjacent said first work station;

c. severing a segment of said ribbon from said ribbon advanced from said first feed means;

d. transporting said severed flexible magnetic segment to a second work station whereupon said segment is placed upon an upper surface of a continuous web of cover patch material supplied by second feed means;

e. severing from said web a portion of said cover patch material upon which said magnetic segment is situated;

f. placing said severed cover patch portion and said corresponding flexible magnetic segment into contact relation with said rear surface of said substrate; and g. laminating said cover patch portion over said flexible magnetic segment upon said rear surface of said substrate.

28. The process of claim 27 which further comprises adjusting the length of said flexible plastic substrate supplied to a corresponding work station by means selected from the group consisting of optical or tactile sensors and timers.

29. The process of claim 27 wherein three evenly spaced magnetic segments are laminated upon said flexible plastic substrate adjacent a lower edge portion thereof.

30. The process of claim 27 which further comprises cutting portions of said continuous length substrate to a predetermined dimension subsequent to laminating said at least one flexible magnetic segment thereupon.

31. The process of claim 27 which further comprises at least partially rewinding a portion of uncut flexible magnetic ribbon after said segment is severed therefrom so as to prevent interference between a trailing edge of said uncut ribbon and the cover patch with its corresponding flexible magnetic segment as said patch and said flexible magnetic segment are raised into contact with said flexible substrate.

32. The process of claim 27 which further comprises:
   a. applying a reinforcing strip across said front surface of a first upper segment of said flexible plastic substrate;
   b. sealing said strip to said upper front surface by dielectric press means;
   c. punching a plurality of evenly spaced apertures through said reinforced surface, said apertures being configured and adapted for the passage of a plurality of corresponding h ok members therethrough; and
   d. forming a perforated tear strip along at least a portion of a second lower segment of said substrate furtherest removed from said reinforced segment.

33. The process of claim 27 wherein said severed flexible magnetic segment is transported to said second work station by vacuum transfer means adapted upon the application of a vacuum thereto, to pick up and transport said segment from said first work station to said second work station whereupon, upon deactivation of said vacuum, said flexible magnetic segment is released onto the upper surface of the web of cover patch material.

34. an apparatus for laminating segments of a flexible magnetic material to a flexible plastic substrate, said apparatus comprising:
   a. means for supplying a plurality of adjustable length segments of a flexible plastic substrate to a substrate support frame associated therewith, each said substrate segment having a front surface and an opposed rear surface,
   b. a frame for supporting at least a portion of said substrate during lamination of a flexible magnetic material to said rear surface thereof, said support frame comprising a substantially planar upper work surface and means for positioning said work surface adjacent said substrate supply means, said work surface defining at least one aperture, each said aperture adapted to permit passage therethrough by at least a portion of a corresponding laminating means positioned below said work surface to said rear surface of said plastic substrate;
   c. an adjustably positioned upper mounting member secured to said support frame substantially transversely above said upper work surface and adapted to support at lest one anvil for providing backing support for said front surface of said substrate during lamination of said flexible magnetic segments to said rear surface thereof; and
   d. at least one laminating means adjustably mounted upon said substrate support frame below said work surface, each said laminating means being in substantially vertical alignment with one of said apertures in said work surface and a corresponding one of said anvils and adapted to laminate to a rear surface of said substrate a segment of a flexible magnetic material together with a correspondingly positioned segment of a cover patch material placed thereover to maintain said magnetic material in contact with said substrate.

35. The apparatus of claim 34 wherein each said laminating means comprises:
   a. a first mounting assembly adapted for severing a segment of said flexible magnetic material unwound from a first supply roll thereof and thereafter transporting said segment from a first location to a second location wherein said segment is deposited upon a corresponding web of cover patch material; and
   b. a second mounting assembly for laminating a segment of said cover patch material and said flexible magnetic segment to said rear surface of said flexible substrate in a manner so as to maintain said magnetic segment in substantially permanent contact with said substrate.

36. The apparatus of claim 35 wherein said first mounting assembly comprises:
   a. a first feed reel adapted for supplying a rolled ribbon of said flexible magnetic material to first roller means;
   b. first roller means located downstream from said fist feed reel and operatively associated therewith for advancing a portion of said flexible magnetic ribbon in the direction of magnetic material applicator means adapted for severing a predetermined length segment thereof, said first roller means further being adapted to permit rotation thereof in a reverse direction for at least partially retracting a leading uncut edge of said flexible magnetic ribbon from a location adjacent said second mounting assembly to prevent any interference between said ribbon and said second mounting assembly; and
   c. magnetic material applicator means adapted for severing a portion of said flexible magnetic ribbon at a first location and transporting said severed portion to a second location removed a distance therefrom.

37. The apparatus of claim 36 wherein said magnetic material applicator means comprises:
   a. cutting means for separating a segment of said magnetic material from said rolled ribbon thereof at said first location; and
   b. means for transporting said magnetic segment to said web of said cover patch material located at said second location and depositing said segment onto an adjacent upper surface of said web,
   said applicator means being capable of independent reciprocal lateral and longitudinal movement in relation to said first mounting assembly.

38. The apparatus of claim 37 wherein said transporting means comprises:
   a. a vacuum hose having a first end and a second end, said first end being attached to means adapted for creating a vacuum within said hose; and
   b. a suction plate member secured to said second end of said vacuum hose, said plate member adapted to facilitate, in the presence of a vacuum within said hose, adherence to said magnetic segment to said transporting means, to permit the transport of said flexible magnetic segment from said first location to said second location, said vacuum thereafter being deactivated to permit said flexible magnetic segment to be deposited upon said surface of said web of cover patch material.

39. The apparatus of claim 36 wherein said second mounting assembly comprises:
   a. a second feed reel adapted for supplying a web of said cover patch material to second roller means;
   b. second roller means located downstream from said second feed reel and operatively associated with said second feed reel for advancing said web of cover patch material in the direction of die-punch assembly means operatively associated therewith;
   c. die-punch assembly means adapted for severing a portion of said cover patch material from said web and laminating said magnetic segment and said corresponding cover patch portion to said rear surface of said flexible substrate; and
   d. tension drive means for adjusting the tension of said web of said cover patch material as said web passes through said die-punch assembly.

40. The apparatus of claim 39 wherein said second mounting assembly is movably mounted upon said laminating means by a bearing to allow said second assembly to be driven in a vertical upward and downward direction by said motor drive means.

41. The apparatus of claim 39 wherein said die-punch assembly means comprises:
   a. a substantially flat die member defining an aperture therein adapted for the passage of at least an upper portion of a punch assembly therethrough; and
   b. a punch assembly comprising
      1. an elongated vertical shaft having a first upper end and a second lower end, said shaft adapted for reciprocal upward and downward movement so as to permit at least said upper end to reciprocally move through said aperture in said die member;
      2. horn means operatively associated with said second lower end of said shaft for supplying a driving force to said shaft; and
      3. a sealing head forming at least a portion of said first upper end of said shaft, said sealing head adapted for severing a potion of said cover patch material from said web and thereafter laminating said patch over said magnetic segment upon said rear surface of said flexible plastic substrate.

42. The apparatus of claim 41 wherein said sealing had is equipped with a recess in an uppermost horizontally planar surface thereof, said recess being at least equal in depth to the cumulative thickness of said magnetic segment and said cover patch.

43. The apparatus of claim 42 wherein said recess in said sealing head is substantially surrounded by sealing means to facilitate bonding said magnetic segment and said corresponding cover patch to said substrate.

44. The apparatus of claim 43 wherein said sealing means is a heat sealer.

* * * * *